United States Patent
Nene

(10) Patent No.: US 9,128,499 B2
(45) Date of Patent: Sep. 8, 2015

(54) APPARATUS AND METHODS TO CONTROL PEAK CURRENT MODE CONTROLLED POWER CONVERTERS USING SELECTIVE NOISE BLANKING

(71) Applicant: Texas Instruments Incorporated, Dallas, TX (US)

(72) Inventor: Hrishikesh Ratnakar Nene, Katy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 210 days.

(21) Appl. No.: 13/775,182

(22) Filed: Feb. 23, 2013

(65) Prior Publication Data
US 2014/0239922 A1    Aug. 28, 2014

(51) Int. Cl.
*H02M 3/156* (2006.01)
*G05F 1/10* (2006.01)
*H02M 1/00* (2007.01)

(52) U.S. Cl.
CPC ......... *G05F 1/10* (2013.01); *H02M 2001/0038* (2013.01)

(58) Field of Classification Search
CPC .................. H02M 2001/0038; H02M 3/156
See application file for complete search history.

(56) References Cited

U.S. PATENT DOCUMENTS

| 6,219,262 B1* | 4/2001 | Burgyan ................ 363/97 |
| 2009/0147548 A1* | 6/2009 | Chang et al. ............ 363/21.18 |
| 2010/0237837 A1* | 9/2010 | Wang et al. ............ 323/234 |

* cited by examiner

*Primary Examiner* — Harry Behm
(74) *Attorney, Agent, or Firm* — Tuenlap D. Chan; Frank D. Cimino

(57) ABSTRACT

An apparatus and a method to control peak current mode controlled power converter system using selective noise blanking are disclosed. The control of the peak current mode controlled power converter system using selective noise blanking is implemented by hardware, software and/or combination of both to carry out adjusting a blanking time and a blanking time period to prevent change of an output of a pulse modulated waveform generator starting at the blanking time for the blanking time period.

6 Claims, 2 Drawing Sheets

US 9,128,499 B2

APPARATUS AND METHODS TO CONTROL PEAK CURRENT MODE CONTROLLED POWER CONVERTERS USING SELECTIVE NOISE BLANKING

FIELD

The present disclosure relates to digital integrated circuits, and, more particularly, to an apparatus and methods to control peak current mode controlled power converters using selective noise blanking.

BACKGROUND

A peak current mode control (PCMC) is a control scheme for power converters enabling, in theory, certain desirable advantages like voltage feed forward, automatic cycle by cycle current limiting and other advantages known to persons skilled in the art. To implement this PCMC control scheme in practice, precisely controlled pulse width modulated (PWM) waveforms to drive control switches in power converters are essential. These power converters often employ a peak current reference without or with slope compensation. The peak current reference is compared with a current sensed at the output of the power converter; the result of the comparison controlling the PWM waveform.

FIG. 1A depicts a conceptual block diagram of a digitally controlled PCMC based power converter system 100. A power converter 102 receives at its input an input voltage $V_{in}$ from a source 104 and provides at its output a regulated voltage $V_{out}$ to a load 106. To accomplish the $V_{out}$ regulation, the $V_{out}$ feedback is provided to block 108 comprising an analog-to-digital (ADC) converter, which digitizes the $V_{out}$ feedback, which is then provided to a first input of a block 110 comprising a comparator and a voltage controller (not shown). A digital reference voltage $V_{ref}$ from a reference voltage source 112 is provided to a second input of the block 110. The digitized $V_{out\_d}$ feedback and the digital reference voltage $V_{ref}$ are compared by the comparator and the result of the comparison is provided to the voltage controller. Based on the comparison, the voltage controller generates voltage $V_{comp}$, which is provided at the output of the voltage controller 110 and serves to derive a peak current reference signal $I_{pref}$.

It is well known by persons of ordinary skills in the art that PCMC based power converter systems suffer from stability issues and sub-harmonic oscillations for operation above 50% duty cycle theoretically. A duty cycle is the time that the PWM waveform spends in an active state. Consequently, the PCMC based power converter systems may implement a slope compensation. The slope compensation can be applied to the peak current $I_{peak}$, decrementing the peak current $I_{peak}$ by a ramp thus arrive at a slope compensated peak current reference signal $I_{pref}$. Alternatively, the slope compensation may be achieved by keeping the peak current $I_{peak}$ constant and increment a feedback current $I_{fb}$ by the ramp.

As depicted in FIG. 1A, the feedback current $I_{fb}$ is sensed at a node of converter 102 dependent on a topology of power converter, means of controlling the converter, and other design criteria known to persons skilled in the art. By means of example, the feedback current may be a current through the load 106, it could be a current through an inductor, transformer primary current, and other nodes known to persons skilled in the art.

For clarity of explanation of the different aspects the slope compensated peak current reference signal $I_{pref}$ is used; however, the disclosed concepts are equally applicable to the case where slope compensation ramp is added to the feedback current $I_{fb}$.

The generation of a slope compensated peak current reference signal $I_{pref}$ is carried out by a block 114, comprising a digital-to-analog (DAC) converter, for converting the digital representation of the voltage $V_{out}$ provided by the voltage controller 114 to an analog representation corresponding to a peak current $I_{peak}$, and a ramp generator which generates a slope for compensation taking the value of the a peak current $I_{peak}$ as initial value for the ramp generator.

The slope compensated peak current reference signal $I_{pref}$ is provided to a first input of a block 116. The second input of the block 116 is provided with a feedback current $I_{fb}$ corresponding to a sensed current in the power converter 102. The block 116 comprises a comparator (not shown), which compares the slope compensated peak current reference signal $I_{pref}$ with the feedback current $I_{fb}$, and the result of the comparison affects various attributes of the PWM waveforms PWM(1)-PWM(n) generated by a PWM generator (not shown) of the block 116 and provided to the power converter 102.

Although as described above, blocks 108, 110, 114, 116, and 112 comprise a digital PCMC controller 101, persons skilled in the art would understand that not all the blocks need to be implemented in the digital PCMC controller 101. By means of an example, the slope compensation, i.e., block 114 may or may not be implemented in the digital PCMC controller 101. Likewise, the comparator, described as a part of block 116, may be external to the digital PCMC controller 101. The digital PCMC controller 101 may optionally be interfaced with or reside inside a digital controller 117, e.g., a Microcontroller, Digital Signal Processor, and any other digital controller known to persons of ordinary skills in the art. The digital controller 117 may be utilized to program various attributes of the PWM waveforms and the slope for compensation; therefore, imparting more intelligence to the system and an ability to adaptively adjust to changing conditions for optimum digitally controlled PCMC based power converter system 100 performance.

The different implementation of the digital PCMC controller 101 may provide a different number of the PWM waveforms in accordance with a proposed use of a particular digital PCMC controller 101. However, it is understood by persons of ordinary skills in the art that not all the waveforms need to be generated and provided to the power converter. Thus, by means of an example a buck power converter may require a single PWM waveform, a synchronous buck power converter may require two PWM waveforms, an isolated phase shifted full bridge direct-current-to-direct-current (DC-DC) converter with synchronous rectification may require six waveforms, and the like.

FIG. 1B depicts an amplitude as a function of time of waveforms of interest regarding block 116. For clarity of explanation and without any loss of generality, only a single PWM waveform is considered; however, the disclosed aspects are equally applicable to a plurality of PWM waveforms.

The PWM period starts at time $t_0$, when the PWM generator 116(2) causes the PWM waveform 118 transitions from a first value $A_1$ to a second value $A_2$. In response the power converter 102 causes a flow of a feedback current $I_{fb}$, and the feedback current $I_{fb}$ 120, provided to the non-inverting input of a comparator 116(1), starts increasing from a value $I_i$. The slope compensated peak current reference signal $I_{pref}$ 122, provided to the inverting input of a comparator 116(1), starts decreasing from a value $I_{peak}$. Although the slope compensated peak current reference signal $I_{pref}$ 122 is depicted as a linearly decreasing, persons skilled in the art will understand that non-linearly decreasing slope compensated peak current reference signal $I_{pref}$ 122 is within the scope of the disclosure.

At time $t_1$, the value of the sensed current through the load $I_{fb}$ 120 and the value of the slope compensated peak current reference signal $I_{pref}$ 122 became equal, which causes a change of the output of the comparator 116(1), which in turn causes the PWM generator 116(2) to transition PWM waveform 118 from a second value $A_2$ to a first value $A_1$. In response, the feedback current $I_{fb}$ 120 starts decreasing.

At time $t_2$, the PWM period ends, and the cycle is repeated.

The digitally controlled PCMC based power converter system 100 is subject to predictable noise, e.g., switching noise from PWM waveforms, switching noise from relays, non-switching digital noise, and other noises generated by the digitally controlled PCMC based power converter system 100. As well understood by persons skilled in the art, the switching noise is a result of fast transition of a signal from one amplitude to another amplitude. Although the predictable noise affects all the circuitry of the digitally controlled PCMC based power converter system 100, proper design and filtering of the circuitry comprising the slope compensated peak current reference signal $I_{pref}$ 122 reduces the level of the predictable noise to negligible levels. However, such a level of filtering cannot be applied to the feedback current $I_{fb}$ 120, because to reduce the level of the predictable noise to negligible levels would cause severe distortion of the transition edges of the PWM waveforms; therefore, negatively affect a performance of the digitally controlled PCMC based power converter system 100. Accordingly, in practice, some predictable noise may be present.

It is noted that in FIG. 1B, both the slope compensated peak current reference signal $I_{pref}$ 122 and the feedback current $I_{fb}$ 120 are idealized waveforms, at least in that no predictable noise is present. Consequently, the output of the comparator 116(1) provided to the PWM generator 116(2) results in a correctly timed PWM duty cycle 122 at the output the PWM generator 116(2). A duty cycle is the time that the PWM waveform spends in an active state, in this case at the second value $A_2$ as a fraction of the PWM period.

As described supra, and depicted in FIG. 1C, the PWM waveform 118 transitions from a first value $A_1$ to a second value $A_2$ at the beginning of the PWM period; therefore, causing the predictable switching noise 120(1) at the beginning of the PWM period. If/when a magnitude of this noise is greater than or equal to the slope compensated peak current reference signal $I_{pref}$ 122, the output of the comparator 116(1) changes, which is reflected on the input of the PWM generator 116(2) and results in an incorrectly timed PWM waveform 118 of the PWM generator 116. Consequently, incorrect power is delivered by the power converter 102 to the load 106.

FIGS. 1A-1C and associated text are simplified for the purpose of clarity of explanation. Consequently, in a more complex power converter, e.g., the above-mentioned isolated phase shifted full bridge direct-current-to-direct-current (DC-DC) converter with synchronous rectification, which requires six PWM waveforms to be generated by the digital PCMC controller, the point in time where the periodic/predictable noise occurs relative to the PWM period as well as the periodic/predictable noise duration may change with changing operating conditions, e.g., input and/or output voltage, load, and other operating conditions, as well as with parameters of the digitally controlled PCMC based power converter system, e.g., temperature. Furthermore, there may be more than a single switching noise in the PWM period. By means of an example, in the isolated phase shifted full bridge direct-current-to-direct-current (DC-DC) converter with synchronous rectification a switching noise occurs twice in the PWM period.

Based on the foregoing, there is a need in the art to avoid this incorrect and undesirable situation in power converters, by implementing selective blanking

SUMMARY

In one aspect of the disclosure, selective noise blanking to control peak current mode controlled power converter system according to appended independent claims is disclosed. Preferred additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

DETAILED DESCRIPTION

Figure 1A:
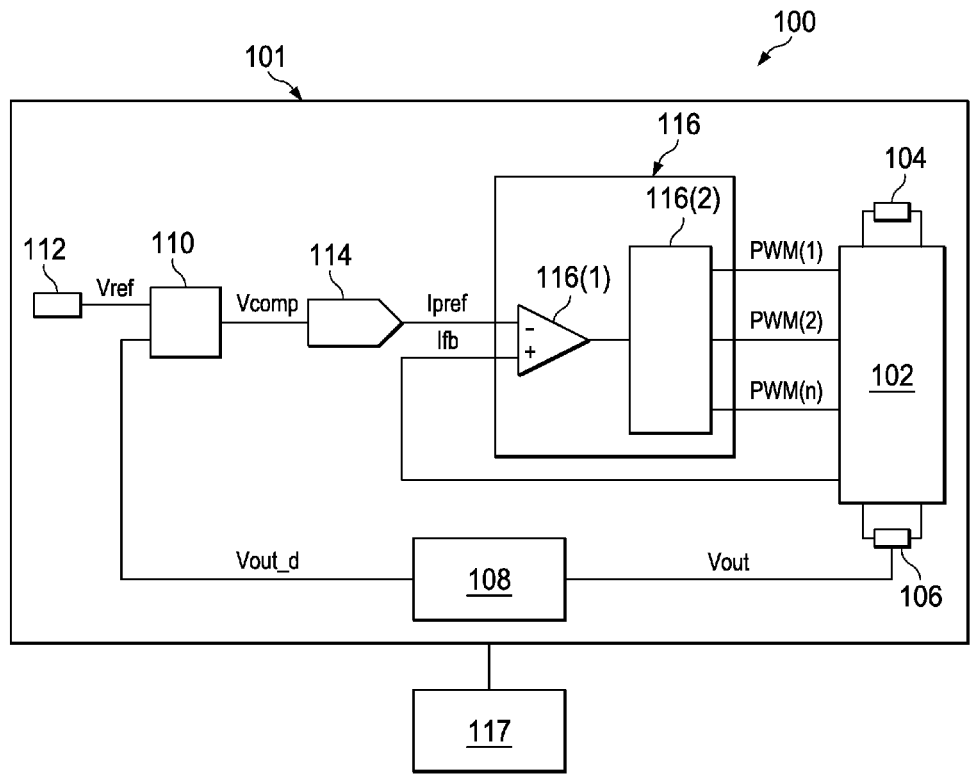
FIG. 1A depicts a conceptual block diagram of a digitally controlled PCMC based power converter system according to known concepts.
Figure 1B:
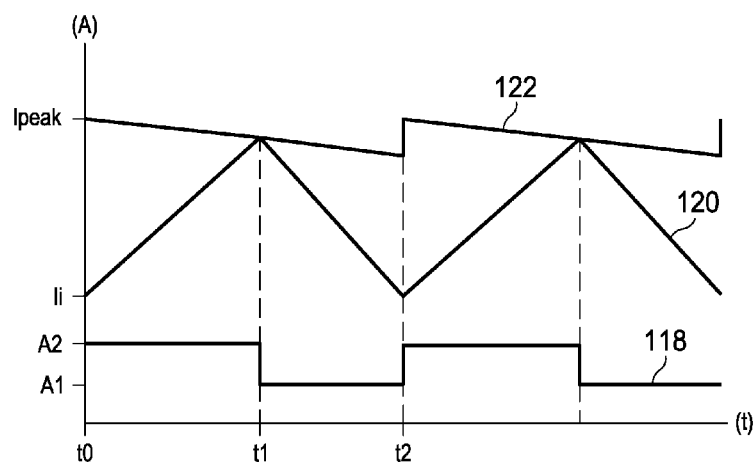
FIG. 1B depicts an amplitude as a function of time of idealized waveforms of interest of FIG. 1A according to known concepts.
Figure 1C:
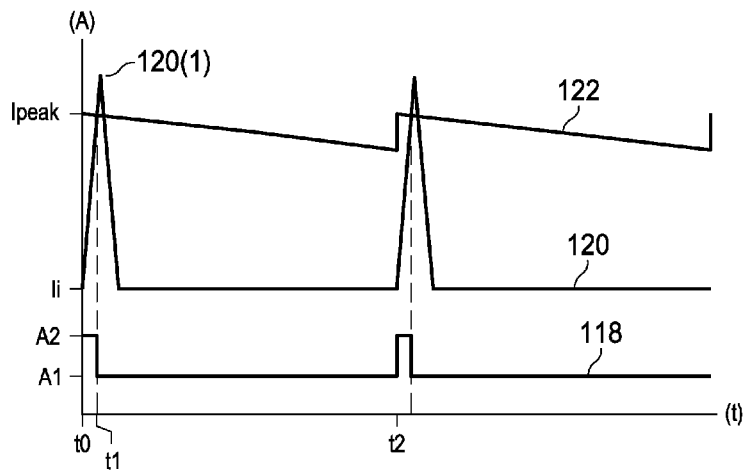
FIG. 1C depicts an amplitude as a function of time of waveforms of interest of FIG. 1A according to known concepts.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes are not intended to illustrate the precise shape of an element and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Figure 2A:
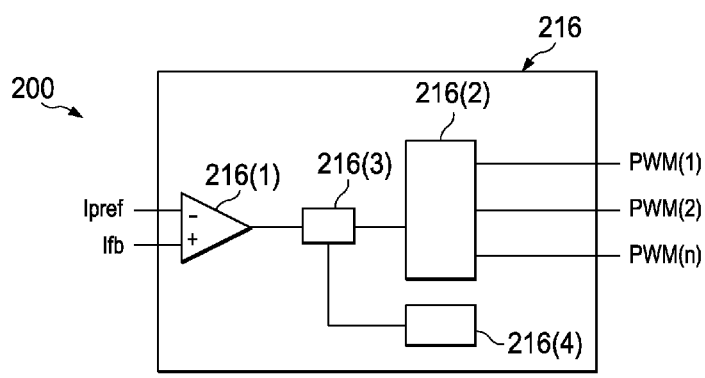
FIG. 2A depicts a conceptual schematic of a comparator logic and a PWM generator used in an exemplary digitally controlled PCMC based power converter system.
Figure 2B:
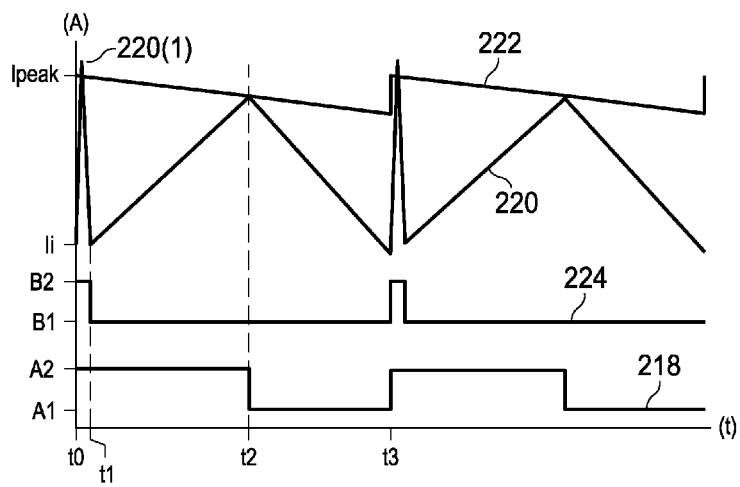
FIG. 2B depicts waveforms of interest of the comparator logic and the PWM generator of FIG. 2A.

FIGS. 2A-2B depict a conceptual schematic of a comparator logic and PWM generator used in an exemplary digitally controlled PCMC based power converter system along with an amplitude as a function of time of waveforms of interest 200 according to aspects of this disclosure.

Considering FIG. 2A, a slope compensated peak current reference signal $I_{pref}$ is provided into an inverting input of a comparator 216(1) and a feedback current $I_{fb}$ 220 is provided into a non-inverting input of the comparator 216(1). As depicted, the blanking circuitry 216(3) is interposed between the output of the comparator 216(1) and the input of the PWM generator 216(2).

The blanking circuitry 216(3) may comprise any device preventing a change of the comparator output or the PWM generator 216(2) input starting at a blanking time t for a blanking time period Δt in accordance with a control signal provided by a controller 216(4). By means of an example, such a device may comprise a switch implemented by any technology; e.g., mechanical, i.e., a relay, electronic, i.e., transistor, a logical circuit, e.g., not and (NAND), not or (NOR), counter implemented in digital/analog way, or any other device known to a person skilled in the art. The blanking circuitry 216(3) may disconnect the output of the comparator 216(1) and connect the input of the PWM generator 216(2) to an appropriate voltage thus preventing change of the input of the PWM generator 216(2).

Referring to FIG. 2B together with FIG. 2A, the blanking time t as well as the blanking time period Δt are provided by the controller 216(4). Because as discussed supra, the point in time where the switching noise occurs relative to the PWM period as well as the switching noise duration may change with changing operating conditions, e.g., input and/or output voltage, load, and other operating conditions, as well as with system parameters, e.g., temperature, the controller 216(4) monitors the operating conditions and system parameters, and adjusts the blanking time t as well as the blanking time period Δt. The blanking time t coincides or precedes the beginning of the noise 220(1); as depicted $t=t_0$; the blanking time period Δt being as long as or longer than the duration of the noise 220(1); as depicted $\Delta t = t_1 - t_0$.

The PWM period starts at time $t_0$, when the PWM generator 216(2) causes the PWM waveform 218 transitions from a first value $A_1$ to a second value $A_2$. In response the feedback current $I_{fb}$ 220, provided to the non-inverting input of a comparator 216(1), starts increasing from a value $I_i$. A noise spike 220(1) is present on the sensed current signal 220. Although the noise is depicted at the start of the PWM cycle, the noise spike 220(1) may occur at different time position in the PWM cycle as discussed supra. The slope compensated peak current reference signal $I_{pref}$ 222, provided to the inverting input of a comparator 216(1), starts decreasing from a value $I_{peak}$.

At the same time $t_0$, the output 224 of the controller 216(4) transitions from a first value $B_1$ to a second value $B_2$, causing the blanking circuitry 216(3) to engage and thus prevent change of the output of the PWM generator 216(2) regardless of the state of the output of the comparator 216(1). At a certain time, the noise spike 222(1) exceeds the slope compensated peak current reference signal $I_{pref}$ 222; however, due to the operation of the blanking circuitry 216(3) the output of the PWM generator 216(2) does not change.

After the noise spike 220(1) recedes at time $t_1$, the feedback current $I_{fb}$, $I_{fb}$ 220 increases. At the same time $t_1$, the output 224 of the controller 216(4) transitions from the second value $B_2$ to the first value $B_1$, causing the blanking circuitry 216(3) to disengage, and, consequently, to allow the PWM generator 216(2) to respond to the change in the state of the output of the comparator 216(1).

At time $t_2$ the value of the sensed current through the load $I_{fb}$ 220 and the value of the slope compensated peak current reference signal $I_{pref}$ 222 became equal, which causes a change of the output of the comparator 216(1), which in turn causes the PWM generator 216(2) to transition PWM waveform 218 from a second value $A_2$ to a first value $A_1$. In response the feedback current $I_{fb}$ 220 starts decreasing.

At time $t_3$, the PWM period ends, and the cycle is repeated.

A person of ordinary skills in the art will understand that the particular location of the blanking circuitry 216(3) interposed between the output of the comparator 216(1) and the input of the PWM generator 216(2) is just one example provided for clarity of explanation of the underlying concept. Thus, in another aspect, the blanking circuitry 216(3) may be interposed between the feedback current $I_{fb}$ 220 and the input of the comparator 216(1). In yet another aspect, the blanking circuitry 216(3) may be integral to the PWM generator 216(2) and in accordance with the control signal 216(4) prevent change of the output of the PWM generator 216(2) regardless of the state of the output of the comparator 216(1).

Based on the foregoing, the blanking circuitry 222 is any circuitry preventing change of the output of the PWM generator 216(2) regardless of the state of the output of the comparator 216(1), starting at a blanking time $t'$ and lasting for a blanking time period Δt, wherein both the time $t_0$ and the time period Δt are adjusted in accordance to operating conditions and system parameters.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The various aspects of this disclosure are provided to enable one of ordinary skill in the art to practice the present invention. Modifications to various aspects of a presented throughout this disclosure will be readily apparent to those skilled in the art, and the concepts disclosed herein may be extended to other applications. Thus, the claims are not intended to be limited to the various aspects of the wave shaping circuitry presented throughout this disclosure, but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. An apparatus comprising:
a power converter configured to generate a feedback current based on a pulse modulated waveform signal;
a pulse modulated waveform generator configured to generate the pulse modulated waveform signal;
a comparator configured to receive a peak current reference signal and the feedback current, and the comparator configured to generate an output signal for controlling the pulse modulated waveform generator based on the peak current reference signal and the feedback current;
a blanking circuitry interposed between the comparator and the pulse modulated waveform generator, configured to prevent the output signal from reaching the pulse modulated waveform generator starting at a blanking time and for a blanking time period; and
a controller coupled with the blanking circuitry, the controller configured to adjust the blanking time and the blanking time period based on an operating condition and a system parameter of the apparatus.

2. The apparatus as claimed in claim 1, wherein the controller is further configured to:
monitor at least one of operating conditions or parameters of the peak current mode controlled power converter system, and
adjust the blanking time and the blanking time period in accordance with the monitored change in at least one of the operating conditions or the parameters of the peak current mode controlled power converter system.

3. The apparatus as claimed in claim 1, wherein the blanking time coincides with or precedes the beginning of a switching noise.

4. The apparatus as claimed in claim 3 wherein the noise is a predictable noise.

5. The apparatus as claimed in claim 1, wherein the blanking time period is as long as or longer than a duration of a switching noise.

6. The apparatus as claimed in claim 1, wherein the blanking circuitry is communicatively connected between the comparator and the pulse width modulated waveform generator.

* * * * *